(12) United States Patent
Templier et al.

(10) Patent No.: US 11,036,124 B2
(45) Date of Patent: Jun. 15, 2021

(54) COLOUR PROJECTOR WITH SPECTRAL CONVERSION COLORATION WHEEL

(71) Applicants: COMMISSARIAT A L'ENERGIE ATOMIQUE ET AUX ENERGIES ALTERNATIVES, Paris (FR); THALES, Courbevoie (FR)

(72) Inventors: Francois Templier, Grenoble (FR); Francois-Henri Luc, Paris la Defense (FR)

(73) Assignees: COMMISSARIAT A L'ENERGIE ATOMIQUE ET AUX ENERGIES ALTERNATIVES, Paris (FR); THALES, Courbevoie (FR)

( * ) Notice: Subject to any disclaimer, the term of this patent is extended or adjusted under 35 U.S.C. 154(b) by 0 days.

(21) Appl. No.: 16/021,975

(22) Filed: Jun. 28, 2018

(65) Prior Publication Data
US 2019/0004413 A1 Jan. 3, 2019

(30) Foreign Application Priority Data

Jun. 29, 2017 (FR) ..................................... 17 56048

(51) Int. Cl.
*G03B 33/08* (2006.01)
*G02B 26/00* (2006.01)
(Continued)

(52) U.S. Cl.
CPC .............. *G03B 33/08* (2013.01); *G02B 1/118* (2013.01); *G02B 26/008* (2013.01);
(Continued)

(58) Field of Classification Search
CPC ...... G03B 33/08; G03B 31/204; G03B 33/00; G03B 21/2033; G02B 1/118;
(Continued)

(56) References Cited

U.S. PATENT DOCUMENTS

| | | | |
|---|---|---|---|
| 7,318,651 B2 * | 1/2008 | Chua ..................... | B82Y 10/00 257/89 |
| 9,274,406 B2 * | 3/2016 | Toyooka ................ | G03B 33/10 |
| 2005/0122487 A1 * | 6/2005 | Koyama ................ | A47F 11/06 353/94 |
| 2005/0231948 A1 * | 10/2005 | Pohlert ................... | F21V 14/06 362/237 |

(Continued)

FOREIGN PATENT DOCUMENTS

DE 20 2016 101 296 U1 3/2016
EP 3 001 679 A1 3/2016

OTHER PUBLICATIONS

French Preliminary Search Report dated Mar. 7, 2018 in French Application 17 56048 filed on Jun. 29, 2017 (with English Translation of Categories Cited Documents).

*Primary Examiner* — Bao Q Truong
(74) *Attorney, Agent, or Firm* — Oblon, McClelland, Maier & Neustadt, L.L.P.

(57) ABSTRACT

A system for projecting images, configured to implement a sequential type colour projection. The system includes an emissive matrix display device; and a wavelength conversion coloration wheel. The coloration wheel includes a transparent zone, and a first photoluminescent zone configured to absorb a blue light beam and to emit in response a beam including a green component and a red component. The system further includes a selection device for blocking alternately the green component or the red component, including at least one dichroic mirror.

8 Claims, 2 Drawing Sheets

(51) Int. Cl.
*G03B 21/20* (2006.01)
*H04N 9/31* (2006.01)
*G02B 1/118* (2015.01)
*G02B 27/28* (2006.01)

(52) U.S. Cl.
CPC ......... *G02B 27/286* (2013.01); *G03B 21/204* (2013.01); *H04N 9/3114* (2013.01); *H04N 9/3138* (2013.01)

(58) Field of Classification Search
CPC ...... G02B 27/286; G02B 26/008; G02B 1/11; G02B 26/007; H04N 9/3114; H04N 9/3138; F21V 9/00; F21V 9/08; F21V 9/30; F21V 9/32; F21V 9/38
See application file for complete search history.

(56) References Cited

U.S. PATENT DOCUMENTS

| | | | |
|---|---|---|---|
| 2007/0086098 A1* | 4/2007 | Sekiguchi | G03B 21/14 359/892 |
| 2012/0075589 A1 | 3/2012 | Li | |
| 2012/0106126 A1 | 5/2012 | Nojima et al. | |
| 2013/0010264 A1* | 1/2013 | Takahashi | H04N 9/3114 353/20 |
| 2013/0100423 A1* | 4/2013 | Yamagishi | G03B 21/204 353/98 |
| 2013/0229631 A1* | 9/2013 | Toyooka | G03B 21/204 353/31 |
| 2016/0077326 A1 | 3/2016 | Yamagishi et al. | |

\* cited by examiner

COLOUR PROJECTOR WITH SPECTRAL CONVERSION COLORATION WHEEL

TECHNICAL FIELD

A colour image may be decomposed into several sub-images, each of a single colour, designated monochromatic components.

A colour image is preferably decomposed into three sub-images.

The invention relates to the field of systems for projecting colour images, in particular colour video projection systems.

These projection systems achieve the projection of a colour image by separate projection of each of the monochromatic components of said image. The projections are designated separated, because they are separated in time or space.

PRIOR ART

Different types of projectors are known in the prior art, in particular projectors configured to implement a sequential type colour projection.

They are projectors configured to project in turn the different monochromatic components of a colour (polychromatic) image.

These different monochromatic components preferably correspond to each of the three primary colours in additive synthesis: red, green and blue.

Hereafter, such a projector is simply designated "sequential type projector".

Figure 1:
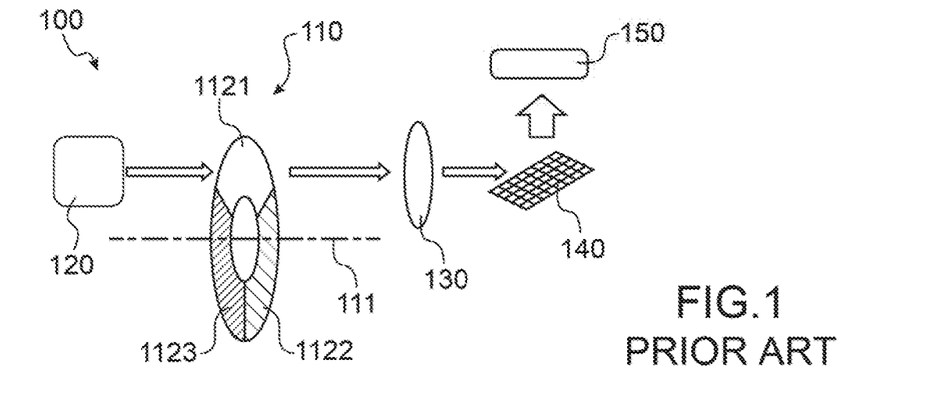
FIG. 1 illustrates, in a schematic manner, a sequential type colour image projector according to the prior art.

FIG. 1 schematically illustrates a known embodiment of a sequential type projector 100.

The operation of the projector 100 is based on the use of a coloration wheel 110 with filters.

The coloration wheel 110 is a disc rotationally mounted around a rotation axis 111. The surface of the disc is occupied by three spectral transmission filters 1121, 1122, 1123, respectively transmitting blue, red and green.

The projector 100 includes:
 a white light source 120;
 the coloration wheel 110, arranged on the optical path of the light beam emitted by the white light source 120;
 a relay lens 130, to collimate the light beam emitted by the white light source 120, that could also be situated upstream of the coloration wheel 110;
 a reflective micro-screen 140, in particular a matrix of micro-mirrors known as DMD (Digital Micro-mirror Device), in which each micro-mirror can take two positions to reflect a light ray in one or the other direction; and
 an optical projection system 150, to form an enlarged image of the reflective micro-screen 140, in a determined plane.

In operation, the white light source 120 emits a continuous signal of constant amplitude.

The coloration wheel 110 turns on itself to take successively a first, a second then a third position.

In the first position, the light beam emitted by the source 120 passes through the coloration wheel 110 at the level of a first spectral filter 1121, transmitting blue only.

In the second position, the light beam emitted by the source 120 passes through the coloration wheel 110 at the level of a second spectral filter 1122, transmitting red only.

In the third position, the light beam emitted by the source 120 passes through the coloration wheel 110 at the level of a third spectral filter 1123, transmitting green only.

The light beam at the output of one of these spectral filters passes through the relay lens 130, and arrives on the reflective micro-screen 140.

The reflective micro-screen 140 receives a signal substantially uniform in space. Each micro-mirror of the reflective micro-screen 140 receives a portion of this signal, and can pivot between a position in which said portion of signal is sent back to the optical projection system 150, and a position in which said portion of signal is sent back in another direction. From these two positions, it is possible to form different grey levels, by varying a proportion of duration during which the signal is sent back to the optical projection system 150.

Thus, the reflective micro-screen 140 transforms a light beam representative of a uniform image into a light beam representative of a pixelated image, and in grey levels.

The reflective micro-screen 140 successively forms different pixelated images, in grey levels.

The frequency of succession of the positions of the coloration wheel 110, and the frequency of succession of the images formed by the reflective micro-screen 140, are synchronised together.

Thus, the reflective micro-screen sends back in turn, to the optical projection system 150, a blue, green then red image, and so on.

By sending back in turn, to the optical projection system 150, the blue, green and red components of a same colour image, the projector 100 realises a sequential type colour image projection.

A drawback of this embodiment is however its size.

Moreover, the spectral filters composing the coloration wheel 110 each have a coefficient of transmission of around 30%, which greatly limits the energy efficiency of the projector 100.

An objective of the present invention is to propose a colour image projector which has a reduced size.

Another aim of the present invention is to propose a colour image projector which offers good energy efficiency.

DESCRIPTION OF THE INVENTION

This objective is attained with a system for projecting images, configured to implement a sequential type colour projection, and which includes:
 an emissive matrix display device; and
 a wavelength conversion coloration wheel, comprising at least two zones each associated with a respective value of a difference in wavelength between a wavelength at the input on the wheel, $\lambda_1$, and a wavelength at the output from the wheel, $\lambda_2$, with $\lambda_2 \geq \lambda_1$.

The invention thus proposes replacing the principle of colour selection by wavelength filtering, by colour selection by wavelength conversion.

The wavelength conversion is realised in practice by a photoluminescent element, present in one at least of said zones of the wavelength conversion coloration wheel.

One of the zones of the coloration wheel may be transparent, without photoluminescent element, which corresponds to a zero difference between $\lambda_1$ and $\lambda_2$.

A spectral filtering coloration wheel only blocks or transmits photons, as a function of their wavelength. Consequently, all the wavelengths that it is wished to have, at one moment or another, at the output of the coloration wheel, must be present at the input of the wheel, and only some of them are found at the output of the wheel, at each instant.

Here, the coloration wheel is rather based on wavelength conversion.

The phenomenon of wavelength conversion corresponds to the absorption of photons at a first wavelength, emitted by the emissive matrix display device, and the emission, in response, of photons at a second wavelength strictly above the first wavelength.

Consequently, all the wavelengths that it is wished to have, at one moment or at another, at the output of the coloration wheel according to the invention, do not have to be present at the input of said wheel. It suffices that the different zones of the coloration wheel according to the invention, and the differences in wavelength associated with these zones, are adapted to obtain the desired wavelengths at the output of the wheel.

Consequently, the energy efficiency associated with the conversion wheel according to the invention makes it possible to obtain greater energy efficiencies than a coloration wheel with spectral filters.

The invention thus makes it possible to obtain a colour image projector which offers good energy efficiency.

The invention also proposes replacing a light source, and a matrix element for forming an image, distinct from each other, by an emissive matrix display device realising both the functions of light emission and image formation.

The wavelength conversion is thus realised directly on an image, emitted by the emissive matrix display device.

Since wavelength conversion is a phenomenon that only makes it possible to obtain wavelengths above the absorbed wavelength, the emissive matrix display device is advantageously adapted to emit at wavelengths situated in the lower part of the visible spectrum, or even below.

The invention thus makes it possible to obtain a colour image projector, compact, having reduced size.

The invention uses a same matrix display device for the display of the different monochromatic components of a same colour image. It thus offers a low manufacturing cost.

Finally, the solution proposed here remains within the framework of a sequential type projection, whereas an obvious solution would have consisted in using a trichromatic emissive display device, constituted of a matrix of macro-pixels, each macro-pixel being constituted of at least one blue pixel, one green pixel and one red pixel. Sequential type projection gives access to higher display resolutions. Moreover, all the pixels of the emissive matrix display device can have the same emission spectrum, which simplifies its manufacture.

The coloration wheel is arranged downstream of the emissive matrix display device, relative to the direction of propagation of the light emitted by said emissive matrix display device.

In operation, the emissive matrix display device successively projects different monochromatic images, in the direction of the wavelength conversion coloration wheel.

These images are advantageously grey level images, each grey level corresponding to a predetermined luminance value.

The coloration wheel receives the light rays emitted thanks to the emissive matrix display device, and takes successively different positions.

Each position corresponds to the incidence of these light rays on one or the other of the zones of the coloration wheel, each zone being associated with a different value of a wavelength jump between a wavelength incident on the wheel, $\lambda_1$, and a wavelength emerging at the output from the wheel, $\lambda_2$.

Thus, the coloration wheel converts a first succession of images which all have the same wavelength spectrum, into a second succession of images which do not all have the same wavelength spectrum.

It is thus possible to realise a sequential type projection of colour images, by projection in turn, for each colour image, of its different spectral components.

The coloration wheel advantageously comprises:
a transparent zone, associated with a zero value of the difference between a wavelength at the input on the wheel and a wavelength at the output from the wheel; and
at least one photoluminescent zone, associated with a non-zero value of the difference between a wavelength at the input on the wheel and a wavelength at the output from the wheel.

In particular, the coloration wheel may comprise:
a transparent zone, associated with a zero value of the difference between a wavelength at the input on the wheel and a wavelength at the output from the wheel;
a first photoluminescent zone, configured to absorb an incident light beam of blue colour and to emit in response a light beam of green colour; and
a second photoluminescent zone, configured to absorb an incident light beam of blue colour and to emit in response a light beam of red colour.

In an alternative, the coloration wheel may comprise:
a transparent zone, associated with a zero value of the difference between a wavelength at the input on the wheel and a wavelength at the output from the wheel;
a first photoluminescent zone, configured to absorb an incident light beam of blue colour and to emit in response a light beam including a green component and a red component;
the system further including selection means, configured to block alternately the green component or the red component, and including at least one dichroic mirror.

BRIEF DESCRIPTION OF THE DRAWINGS

The present invention will be better understood on reading the description of exemplary embodiments given for purely indicative purposes and in no way limiting, while referring to the appended drawings in which.

DETAILED DESCRIPTION OF PARTICULAR EMBODIMENTS

Figure 2A:
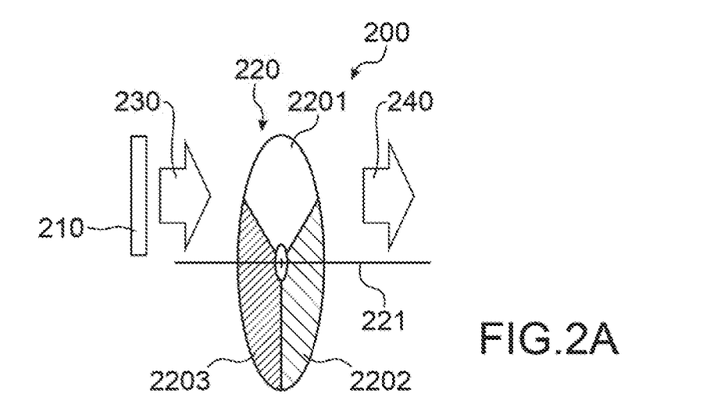
FIGS. 2A to 2C illustrate, in a schematic manner, a first embodiment of a system for projecting images according to the invention.

FIG. 2A schematically illustrates a first embodiment of a system 200 for projecting images, according to the invention.

Figure 2B:
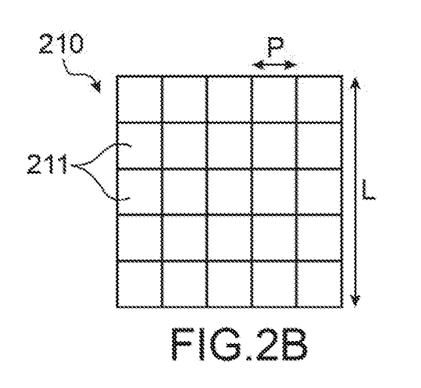
Figure 2C:
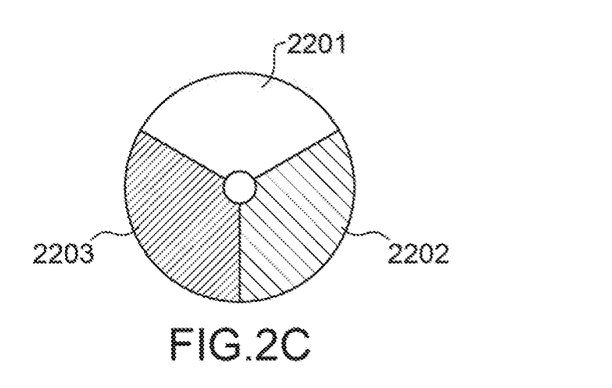

The system 200 includes:
an emissive matrix display device 210 (see FIG. 2B); and
a wavelength conversion coloration wheel 220 (see FIG. 2C).

The emission spectrum of the emissive matrix display device 210 has an emission peak, called main peak, centred on a wavelength situated in the visible (between 400 nm and 800 nm) or the near ultra-violet (about from 300 nm to 400 nm) spectrum.

Here, the emissive matrix display device 210 more particularly has an emission spectrum with an emission peak in the blue, that is to say centred on a wavelength comprised between 440 nm and 500 nm.

If need be, this emission spectrum may have additional peaks, not exploited by the system for projecting images, situated outside of the visible and the near ultra-violet spectrum, for example situated in the infrared.

Whatever the case, it is considered hereafter that the emissive matrix display device supplies a monochromatic emission associated with the main peak, here a monochromatic emission in the blue.

The pixels of the emissive matrix display device 210 are distributed according to a square (or rectangular) matrix, of side(s) L (respectively L1, L2 for a rectangular matrix) comprised here between 5 mm and 20 mm.

The pixel pitch P is here below 10 μm, for example equal to 5 μm.

The emissive matrix display device 210 thus forms a micro-screen.

It is represented in FIG. 2B, according to a front view.

The emissive matrix display device 210 is adapted to supply a lighting of very high luminous intensity, for example more than $10^3$ Cd/m$^2$, and even up to $10^7$ Cd/m$^2$.

Each pixel is constituted here of a light emitting diode 211, and more particularly a light emitting diode based on gallium nitride (GaN), here a light emitting diode made of indium gallium nitride (InGaN).

The light emitting diodes 211 may be designated micro-LEDs, on account of their dimensions of the order of a micrometre (distribution pitch here below 10 μm).

Each light emitting diode 211 is connected to an electric current source, respectively electric voltage source, not represented. The light intensity of the signal emitted by the light emitting diode 211 is a function of its supply current, respectively its supply voltage. For example, this light intensity of the signal emitted by the light emitting diode 211 directly depends on the amplitude of its supply current, respectively supply voltage.

Thus, the matrix of light emitting diodes is adapted to display a monochromatic image of blue colour, pixelated, and in grey levels. Each pixel corresponds to one of the light emitting diodes 211, and the value of the grey level associated with a pixel corresponds to the luminance of the corresponding light emitting diode 211.

Hereafter, it is considered that this grey level also corresponds to the light intensity of the beam emitted by said corresponding light emitting diode.

The light signal 230 emitted by the matrix of light emitting diodes, and associated with this image of blue colour, propagates up to the coloration wheel 220, situated on the optical path of this signal 230.

The coloration wheel 220 is a disc, rotationally mounted around an axis of rotation 221. The axis of rotation 221 extends orthogonally to the plane of the disc, passing through the centre of the disc.

It is represented in FIG. 2C, according to a front view.

The surface of the disc is occupied by three zones 2201, 2202, 2203.

The axis of rotation 221 is parallel to a central axis of propagation of the light signal 230 emitted by the matrix of light emitting diodes, but offset relative to this axis, such that this light signal passes through one or the other zone 2201, 2202, 2203, depending on an angle of rotation of the coloration wheel 220 around the axis 221.

Here, the three zones 2201, 2202, 2203 all have the same dimensions.

They each extend along a portion of disc defined by a circular arc of 120°.

The second zone 2202 is offset by 120° relative to the first zone 2201, around the axis of rotation 221.

The third zone 2203 is offset by 240° relative to the first zone 2201, around the axis of rotation 221.

The first zone 2201 is here a simple plate transparent in the visible, or even a through opening in the surface of the disc.

The second zone 2202 is a photoluminescent zone.

In the same way, the third zone 2203 is a photoluminescent zone.

The zone 2202, respectively 2203, is called photoluminescent, in that it includes a photoluminescent element, that is to say adapted to absorb photons at a first wavelength then, in reaction to this absorption of photons, to emit photons at a second wavelength distinct from the first wavelength.

The photoluminescent element includes for example a semiconductor material with multi-quantum wells, or a material comprising semiconductor nano-crystals of "quantum dot" type, or an inorganic material based on phosphorous, or an organic colorant, etc.

The photoluminescent element may notably be made of yttrium aluminium garnet (YAG) activated by trivalent cerium ion, also called YAG:Ce or YAG:Ce3+.

When the photoluminescent element comprises nano-crystals, said nano-crystals may include at least one material selected from the group comprising cadmium selenide, indium phosphide, cadmium sulphide, zinc sulphide, zinc selenide, cadmium telluride, zinc telluride, cadmium oxide, zinc and cadmium oxide, zinc and cadmium sulphide, zinc and cadmium selenide, silver and indium sulphide and a mixture of at least two of these compounds.

These nano-crystals are semiconductor nano-crystals, of which one at least of the dimensions is less than 100 nm. Due to their small dimensions, these nano-crystals behave like potential wells, comparable to quantum wells.

When the photoluminescent element includes a semiconductor material with multi-quantum wells, this element may be formed of a semiconductor layer constituted of layers with quantum wells arranged between barrier layers, the barrier layers being for example based on GaN, AlP or AlInP, and the wells being based on GaN, InN, InGaN, AlGaN, AlN, AlInGaN, and/or GaP.

The zone 2202, respectively 2203, thus makes it possible to realise a wavelength conversion, in that it absorbs an incident beam of which the spectrum is centred on a first wavelength, and emits in response a beam, called output beam, of which the spectrum is centred on a second wavelength distinct from the first wavelength.

Here, the second zone 2202 makes it possible more particularly to convert the light signal 230 emitted by the matrix of light emitting diodes, and incident on the coloration wheel 220, into an output beam 240 of red colour.

The photoluminescent element which extends in the zone 2202 then includes, for example, nano-crystals with a core made of CdSe (cadmium selenide) and a shell made of ZnS (zinc sulphide).

Similarly, the third zone 2203 more particularly makes it possible to convert the light signal 230 emitted by the matrix of light emitting diodes, and incident on the coloration wheel 220, into an output beam 240 of green colour.

The photoluminescent element which extends in the zone 2203 then includes, for example, nano-crystals with a core made of CdSe and a shell made of ZnS (with diameters different from those of the nano-crystals of the second zone 2202).

A beam of blue colour herein designates a beam of which the light spectrum has an amplitude peak centred on a wavelength comprised between 440 nm and 500 nm.

A beam of red colour herein designates a beam of which the light spectrum has an amplitude peak centred on a wavelength comprised between 600 nm and 750 nm.

A beam of green colour herein designates a beam of which the light spectrum has an amplitude peak centred on a wavelength comprised between 510 nm and 570 nm.

The phenomenon of photoluminescence realises an emission of photons at a wavelength above that of the absorbed photons. It is thus advantageous that the emissive matrix display device 210 has an emission spectrum with an emission peak in the low wavelengths. Here, this emission peak is in the blue, which makes it possible to reduce the number of photoluminescent elements in the coloration wheel.

The output beam 240 emitted by the zone 2202, respectively 2203, next propagates in moving away from the coloration wheel 220 and the matrix of light emitting diodes.

Although the light beam 230 is in reality absorbed by the zone 2202, respectively 2203, everything takes place as if said beam passed through said zone 2202, respectively 2203, and came out of it with a modified wavelength.

The coloration wheel 220 is configured to turn on itself in such a way as to take in turn three positions:
- a first position in which the intersection of the light signal 230 emitted by the matrix of light emitting diodes, with the coloration wheel 220, extends entirely over the first zone 2201;
- a second position in which the intersection of the light signal 230 emitted by the matrix of light emitting diodes, with the coloration wheel 220, extends entirely over the second zone 2202; and
- a third position in which the intersection of the light signal 230 emitted by the matrix of light emitting diodes, with the coloration wheel 220, extends entirely over the third zone 2203.

In the first position, the light signal 230 emitted by the matrix of light emitting diodes passes through the coloration wheel 220 without being absorbed or converted, then propagates in moving away from the coloration wheel 220 and the matrix of light emitting diodes. The output beam 240, emerging from the coloration wheel 220, thus has the same spectrum as the light signal 230 emitted by the matrix of light emitting diodes.

The output beam 240 then corresponds to a grey level image, of blue colour.

In the second position, the output beam 240, emerging from the coloration wheel 220 corresponds to the light signal 230 emitted by the matrix of light emitting diodes, and wavelength converted. The wavelength conversion realises an absorption in the blue and an emission in the red.

The output beam 240 then corresponds to a grey level image, of red colour.

In the third position, the output beam 240, emerging from the coloration wheel 220 corresponds to the light signal 230 emitted by the matrix of light emitting diodes, and wavelength converted. The wavelength conversion realises an absorption in the blue and an emission in the green.

The output beam 240 then corresponds to a grey level image, of green colour.

In each of these positions:
- the light signal 230, incident on the coloration wheel 220, forms a signal at the input on the wheel, having a spectrum with an emission peak centred on a first wavelength, $\lambda_1$, called input wavelength (here the emission wavelength of the light emitting diodes 211); and
- the output beam 240, emerging from the coloration wheel 220, forms an output signal, having a spectrum with a peak centred on a second wavelength, $\lambda_2$, called output wavelength (equal to the input wavelength when the coloration wheel is in its first position, greater if not).

Thus, the coloration wheel 220 is adapted to convert a first succession of images which all have the same spectrum in wavelength, into a second succession of images which do not all have the same spectrum in wavelength. In particular, the first succession of images includes uniquely images in blue, whereas the second succession of images includes blue images, red images and green images.

The system 200 for projecting images, according to the invention, is configured to implement a sequential type colour image projection.

In other words, it is configured so that the output beam 240 corresponds in turn to the blue, red then green components of a same colour image.

This embodiment is particularly compact, and may in particular not comprise any dichroic mirror.

Figure 3:
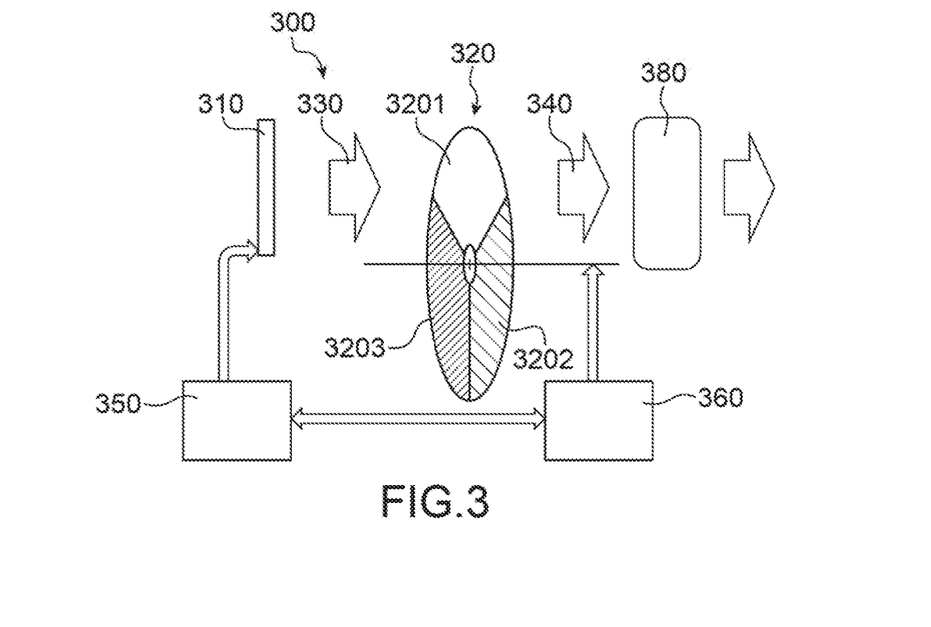
FIG. 3 illustrates more particularly means for achieving the sequential type projection, in a system for projecting images according to the invention.

FIG. 3 illustrates in greater detail the means implemented to achieve a sequential type colour images projection.

FIG. 3 will only thus be described for its differences relative to FIG. 2A.

Here, a system 300 for projecting images is represented.

The system 300 for projecting images includes:
- an emissive matrix display device 310, as described with reference to FIGS. 2A and 2B, configured to emit a light signal 330; and
- a coloration wheel 320, comprising three zones 3201, 3202, 3203 such as described with reference to FIGS. 2A and 2C, and from which the output beam 340 emerges.

The system 300 for projecting images also includes:
- control means 350, configured to control the successive display of a plurality of images by the emissive matrix display device 310, here monochromatic images of blue colour; and
- a motor 360, configured to drive rotationally the coloration wheel 320, and to position it successively in one among the several positions described above, a frequency of succession of the positions taken by the coloration wheel being synchronised with a frequency of succession of images displayed by the emissive matrix display device.

The positions of the coloration wheel each correspond to a position in which the intersection of the light signal 330 emitted by the matrix of light emitting diodes, with the coloration wheel 320, extends entirely over the first zone 3201, respectively second zone 3202, respectively third zone 3203.

The different chromatic components of a same colour image can succeed each other in one order or in another.

The different chromatic components succeed each other in particular according to a frequency f of N components per second, corresponding to a scrolling of colour images at a frequency of 3*N images per second.

The value of N is generally equal to 50. It may be advantageous for the image quality (notably to reduce flicker) to increase this value of N to 100 or 200. The invention makes it possible to have access to such values of N, thanks to the use of a matrix of LEDs, having a very rapid response time. Such values cannot be reached with systems according to the prior art based on the use of micro-screens such as LCD micro-screens.

The control means 350 and the motor 360, synchronised together, will not be described here in greater detail. Indeed, their implementation details do not present any difficulty for those skilled in the art, specialists in sequential type colour display.

In particular, the synchronisation implemented between the rotation of the coloration wheel 320 and the display of the images by the emissive matrix display device 310 is similar to the synchronisation implemented, in the prior art, between a coloration wheel with filters and a display of images by a reflective or transmissive micro-screen (see FIG. 1).

In FIG. 3 are also represented an optical projection system 380, including at least one refractive optic, and configured to form an image of the matrix of light emitting diodes in a predetermined focus plane (said image being blue, red or green).

Figure 4:
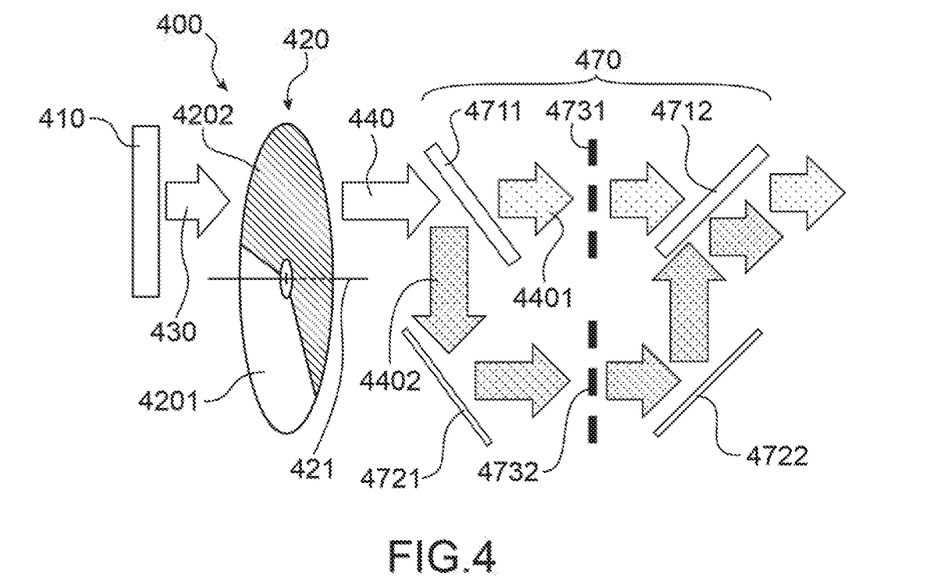
FIG. 4 illustrates, in a schematic manner, a second embodiment of a system for projecting images according to the invention.

FIG. 4 illustrates, in a schematic manner, a second embodiment of a system 400 for projecting images according to the invention.

The embodiment of FIG. 4 will only be described for its differences relative to the embodiment of FIGS. 2A to 2C.

The wavelength conversion coloration wheel 420 here comprises uniquely two zones 4201, 4202.

Here, the two zones 4201, 4202 do not have the same dimensions.

The zone 4201 extends over a portion of disc defined by a circle arc of 120° around the axis of rotation of the wheel 420, whereas the zone 4202 extends over a portion of disc defined by a circle arc of 240° around the same axis, the two zones 4201 and 4202 extending together over 360° around this same axis.

The first zone 4201 is here a simple plate transparent in the visible, or even a through opening in the coloration wheel 420.

The second zone 4202 is a photoluminescent zone.

It makes it possible to convert the light signal 430 emitted by the emissive matrix display device 410, and incident on the coloration wheel 420, into an output beam 440 having a spectrum with two peaks, one corresponding to an emission in the green, and the other to an emission in the red.

In particular, the output beam 440 has a spectrum with an amplitude peak centred on a wavelength comprised between 600 nm and 750 nm, and an amplitude peak centred on a wavelength comprised between 510 nm and 570 nm.

The photoluminescent element which extends in the zone 4202 includes for example two types of nano-crystals, each with a core made of CdSe and a shell made of ZnS, and which differ by their diameters.

The coloration wheel 420 is configured to turn on itself in such a way as to take in turn two positions:
 a first position in which the intersection of the light signal 430 emitted by the emissive matrix display device 410, with the coloration wheel 420, extends entirely over the first zone 4201;
 a second position in which the intersection of the light signal 430 emitted by the emissive matrix display device 410, with the coloration wheel 420, extends entirely over the second zone 4202.

In the first position, the light signal 430 emitted by the matrix of light emitting diodes passes through the coloration wheel 420 without being absorbed, then propagates in moving away from the coloration wheel 420 and the matrix of light emitting diodes. The output beam 440, emerging from the coloration wheel 420, thus has the same spectrum as the light signal 430 emitted by the matrix of light emitting diodes.

The output beam 440 then corresponds to a grey level image, of blue colour.

In the second position, the output beam 440, emerging from the coloration wheel 420 corresponds to the light signal 430 emitted by the emissive matrix display device 410, and wavelength converted. The wavelength conversion realises an absorption in the blue and an emission in the red and the green.

The output beam 440 then corresponds to a grey level image, having two chromatic components, one red, the other green.

Unless one of the chromatic red and green components is zero, the output beam 440 appears yellow, colour corresponding to a combination of red and green.

Thus, the coloration wheel 420 is adapted to convert a first succession of images which all have the same spectrum in wavelength, into a second succession of images which do not all have the same spectrum in wavelength. In particular, the first succession of images includes uniquely images in blue, whereas the second succession of images includes images in blue, and images comprising a red component and a green component.

The output beam 440 next passes through the wavelength separation means 470.

These means here include two dichroic mirrors 4711, 4712, two simple mirrors 4721, 4722, and two moveable shutters (or obturators) 4731, 4732.

The output beam 440, emerging from the coloration wheel 420, propagates up to a first dichroic mirror 4711, laid out at 45° relative to the axis of propagation of said output beam 440.

A dichroic mirror is configured to reflect or to transmit light rays as a function of their wavelength.

Here, the first dichroic mirror 4711 is configured to separate the green and red spectral contributions of an output beam such as described above, one contribution being reflected, and the other transmitted.

For example, the first dichroic mirror 4711 transmits light rays at wavelengths below 580 nm, and reflects wavelengths above 580 nm.

Thus, the green contribution 4401 of the output beam 440 passes through the first dichroic mirror 4711, whereas the red contribution 4402 of the output beam 440 is reflected by the first dichroic mirror 4711.

The green contribution 4401 propagates in a straight line up to the first moving shutter 4731.

A moving shutter herein designates an opaque mechanical part, moveable between a closed position in which it blocks a light beam coming from the coloration wheel 420, and an open position in which it allows said light beam to pass.

The moving shutter may include an absorbent surface, to absorb, in closed position, said light beam.

If the first moving shutter 4731 is in open position, the green contribution 4401 passes through the first moving shutter 4731 and propagates up to the second dichroic mirror 4712.

If the first moving shutter 4731 is in closed position, the propagation of the green contribution 4401 is stopped.

The second dichroic mirror 4712 is identical to the first dichroic mirror, and laid out at 90° relative thereto.

It allows the green contribution 4401 to pass, up to the output of the system 400 for projecting images according to the invention.

Similarly, the red contribution 4402 is reflected at 90° to a first then a second simple mirrors 4721, 4722.

The first and second simple mirrors are laid out at 90° relative to each other, and configured together to direct a light beam up to the second dichroic mirror 4712.

On the optical path of the red contribution 4402, between the first and second dichroic mirrors 4711, 4712, extends a second moving shutter 4732.

The second moving shutter 4732 is identical to the first moving shutter, and extends here between the first and second simple mirrors 4721, 4722.

If the second moving shutter 4732 is in open position, the red contribution 4402 passes through the second moving shutter 4732 and propagates up to the second dichroic mirror 4712.

If the second moving shutter 4732 is in closed position, the propagation of the red contribution 4402 is stopped.

The second dichroic mirror 4712 is laid out to reflect the red contribution 4402, and to direct it to the output of the system 400 for projecting images according to the invention.

Here, the blue beam, transmitted by the first zone 4201 of the coloration wheel, follows the same optical path as the green contribution 4401.

It is however possible to implement alternatives in which this blue beam follows rather the same optical path as the red contribution 4402.

The switchover of the moveable shutters 4731, 4732 is synchronised with the rotation of the coloration wheel 420.

The system 400 is configured, in particular, to take in turn three positions:
- a first position in which the intersection of the light signal 430 emitted by the emissive matrix display device 410, with the coloration wheel 420, extends entirely over the first zone 4201, and in which the first moving shutter 4731 is open (here the second moving shutter can be open or closed);
- a second position in which the intersection of the light signal 430 emitted by the emissive matrix display device 410, with the coloration wheel 420, extends entirely over the second zone 4202, and in which the first moving shutter 4731 is open and the second moving shutter 4732 is closed; and
- a third position in which the intersection of the light signal 430 emitted by the emissive matrix display device 410, with the coloration wheel 420, extends entirely over the second zone 4202, and in which the first moving shutter 4731 is closed and the second moving shutter 4732 is open.

In the first position, the beam emerging from the system 400 is identical to the light signal 430 emitted by the emissive matrix display device 410. It is a signal corresponding to a grey level image, of blue colour.

In the second position, the beam emerging from the system 400 corresponds to the green contribution of a signal obtained after wavelength conversion by the coloration wheel, and from the light signal 430 emitted by the emissive matrix display device 410. It is a signal corresponding to a grey level image, of green colour.

In the third position, the beam emerging from the system 400 corresponds to the red contribution of a signal obtained after wavelength conversion by the coloration wheel, and from the light signal 430 emitted by the emissive matrix display device 410. It is a signal corresponding to a grey level image, of red colour.

The different beams that can emerge from the system 400 all propagate along a same optical path, at the output of the system 400.

The system 400 for projecting images, according to the invention, is configured to implement a projection of colour images, of sequential type.

In other words, it is configured so that the beam at the output of the system 400 corresponds in turn to the blue, red then green components of a same colour image.

The precise means to implement this sequential type colour image projection are not further described herein.

They are based on the same principle as what is described regarding FIG. 3, the coloration wheel here having the same position for the projection of the red component and the green component of an image.

In particular, a frequency of succession of images displayed by the emissive matrix display device is synchronised with a frequency of succession of the positions taken by the system 400, such as described above, these positions involving the coloration wheel, the first moving shutter and the second moving shutter.

The invention is not limited to the examples described above, and numerous alternatives may be implemented without going beyond the scope of the invention.

In particular, in the figures, embodiments are represented in which the coloration wheel according to the invention is configured to receive a light beam coming directly from the emissive matrix display device. The emissive matrix display device then emits a beam with an emission peak centred on the wavelength at the input on the wheel, $\lambda_1$. The coloration wheel is arranged downstream of the emissive matrix display device, directly thereafter. However, the invention also covers alternatives in which the coloration wheel according to the invention is configured to receive a light beam coming indirectly from the emissive matrix display device. For example, an ancillary wavelength conversion element may be arranged between the emissive matrix display device and the coloration wheel, adapted to convert a light beam emitted by the emissive matrix display device, into a light beam at the wavelength at the input on the wheel, $\lambda_1$.

According to other alternatives, the emissive matrix display device may be constituted of light emitting diodes other than diodes based on GaN, or a matrix of organic light emitting diodes (OLED).

The invention may also use another spectral decomposition than the decomposition into the primary colours red, blue and green.

The coloration wheel may only have photoluminescent zones. In this case, the emissive matrix display device is configured to emit a light beam with an emission peak centred on a wavelength below 440 nm (in the near ultra-violet or even the ultra-violet), and the coloration wheel according to the invention has a photoluminescent zone for conversion to blue.

Other mountings for separating the components of a beam at the output of the coloration wheel may also be implemented, without going beyond the scope of the present invention.

The invention finds advantageous applications in the field of compact projectors, and HUD (head up displays).

The invention claimed is:

1. A system for projecting images, configured to implement a sequential type colour projection, wherein:
   an emissive matrix display device that is a matrix of light emitting diodes configured to display a monochromatic image of blue colour, pixelated, and in grey levels; and
   a wavelength conversion coloration wheel, comprising at least two zones each associated with a respective value of a difference in wavelength between a wavelength at the input on the wheel, $\lambda_1$, and a wavelength at the output from the wheel, $\lambda_2$, with $\lambda_2 \geq \lambda_1$;

the at least two zones are on a surface of the coloration wheel and extend together over 360° around an axis of rotation of the coloration wheel, in a region between a center region of the coloration wheel and an outer edge of the coloration wheel, wherein each of the at least two zones occupies a portion of said region defined by a circle arc angle that is less than 360°;

wherein the coloration wheel comprises:
  a transparent zone among the plurality of zones, associated with a zero value of the difference between a wavelength at the input on the wheel and a wavelength at the output from the wheel, the transparent zone configured to pass through a light beam emitted from the emissive matrix display device when the coloration wheel is rotated to a first position;
  a first photoluminescent zone, configured to absorb the incident light beam of the blue colour and to emit in response a light beam comprising a green component and a red component in the same beam, when the coloration wheel is rotated to a second position;
wherein the system further comprises selection means, configured to block alternately the green component or the red component, and comprising at least one dichroic mirror and at least one moveable obturator.

2. The system for projecting images according to claim 1, wherein the coloration wheel is laid out to receive a light beam coming from the emissive matrix display device, and wherein the emissive matrix display device is configured to emit a light beam with an emission peak centred on said wavelength at the input on the wheel, $\lambda_1$.

3. The system for projecting images according to claim 1, wherein the emissive matrix display device is configured to emit a light beam with an emission peak centred on a wavelength below 500 nm.

4. The system for projecting images according to claim 1, wherein one at least of said zones comprises a photoluminescent element comprising nano-crystals.

5. The system for projecting images according to claim 1, wherein the emissive matrix display device comprises a matrix of light emitting diodes based on gallium nitride.

6. The system for projecting images according to claim 1, wherein the pixels of the emissive matrix display device are distributed according to a square or rectangular matrix of side(s) comprised between 5 mm and 20 mm.

7. The system for projecting images according to claim 1, wherein the transparent zone extends over a portion of disc defined by an arc of circle of 120° around the axis of rotation of the coloration wheel, whereas the first photoluminescent zone extends over a portion of disc defined by an arc of circle of 240° around the same axis, both transparent zone and photoluminescent zones extending together over 360° around this same axis.

8. A system for projecting images, configured to implement a sequential type colour projection, wherein:
  an emissive matrix display device that is a matrix of light emitting diodes configured to display a monochromatic image of blue colour, pixelated, and in grey levels; and
  a wavelength conversion coloration wheel, comprising at least two zones each associated with a respective value of a difference in wavelength between a wavelength at the input on the wheel, $\lambda 1$, and a wavelength at the output from the wheel, $\lambda 2$, with $\lambda 2 \geq \lambda 1$;
the at least two zones are on a surface of the coloration wheel and extend together over 360° around an axis of rotation of the coloration wheel, in a region between a center region of the coloration wheel and an outer edge of the coloration wheel, wherein each of the at least two zones occupies a portion of said region defined by a circle arc angle that is less than 360°;
wherein the coloration wheel comprises:
  a transparent zone among the plurality of zones, associated with a zero value of the difference between a wavelength at the input on the wheel and a wavelength at the output from the wheel, the transparent zone configured to pass through a light beam emitted from the emissive matrix display device when the coloration wheel is rotated to a first position;
  a first photoluminescent zone, configured to absorb the incident light beam of the blue colour and to emit in response a green light beam, when the coloration wheel is rotated to a second position; and
  a second photoluminescent zone, configured to absorb the incident light beam of the blue colour and to emit in response a red light beam, when the coloration wheel is rotated to a third position;
wherein the transparent zone, the first photoluminescent zone, and the second photoluminescent zone, each have a circle arc angle of 120° around the rotation axis of the coloration wheel.

\* \* \* \* \*